Jan. 11, 1944.  E. R. PERSON  2,338,735
MANUFACTURE OF TOOTHED ARTICLES
Filed July 8, 1940  2 Sheets-Sheet 1

Inventor.
EARL R. PERSON
By Attorney
Charles R. Fay

Jan. 11, 1944.  E. R. PERSON  2,338,735
MANUFACTURE OF TOOTHED ARTICLES
Filed July 8, 1940  2 Sheets-Sheet 2
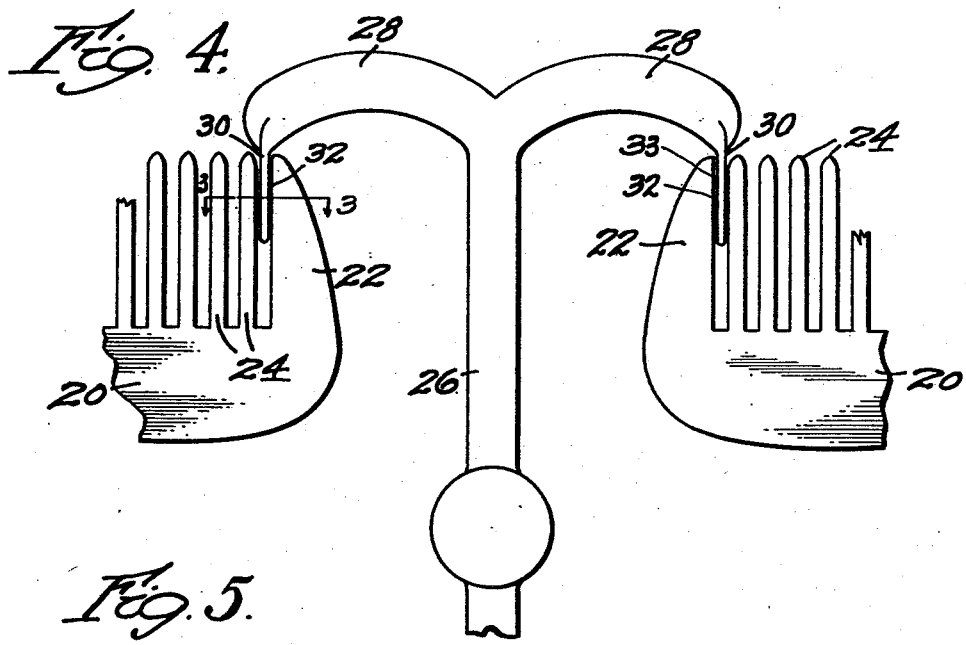
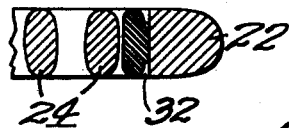
Inventor.
Earl R. Person
By attorney
Charles R. Fay Patented Jan. 11, 1944

2,338,735

UNITED STATES PATENT OFFICE 2,338,735

MANUFACTURE OF TOOTHED ARTICLES

Earl R. Person, Leominster, Mass., assignor to E. I. du Pont de Nemours & Company, Wilmington, Del., a corporation of Delaware Application July 8, 1940, Serial No. 344,362

9 Claims. (Cl. 18—55)

This invention relates to a new and improved method in the manufacture of toothed articles, such as hair combs, such articles being made of plastic materials by injection molding.

Objects of the invention include the provision of a method in the manufacture of such articles as combs in which the finishing step of smoothing and polishing the comb at the point of breakage or severance of the sprue may be completely avoided; the provision of a method of manufacturing combs by injection molding in which the heated plastic material which forms the article is run into the die at such a location that the sprue may be merely clipped or cut off, and no further finishing operation is necessary, without injury to the appearance or utility of the comb; and the provision of a method of molding combs by injection of plastic material into a die at a point which is not readily apparent in the finished article, this point being on an inside surface of a tooth of the comb.

Other objects and advantages of the invention will appear hereinafter.

Reference is to be had to the accompanying drawings, in which

Fig. 4 is a plan view of a layout of a plurality of combs as they appear after being molded in the die of Fig. 1;

Fig. 5 is a section on line 5—5 of Fig. 4; and

Fig. 6 is a view similar to Fig. 5 but showing a section according to Fig. 2.

Figure 1:
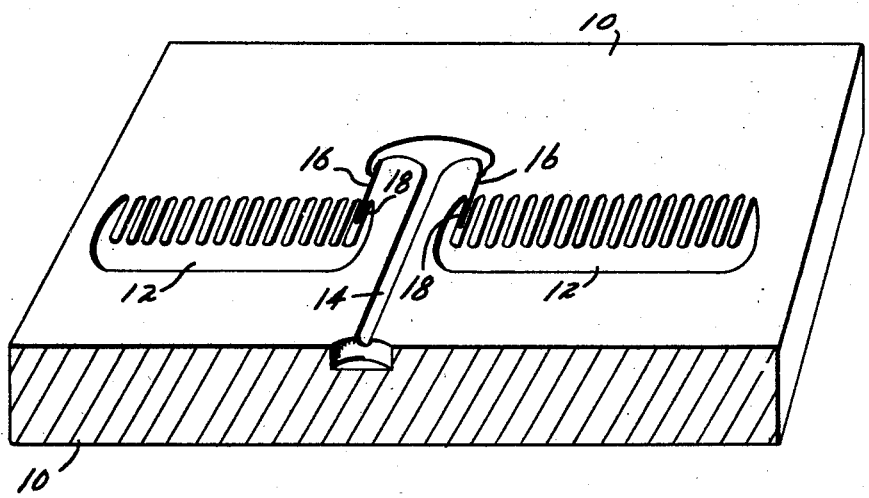
Fig. 1 is a perspective view of a die part constructed according to a form of the invention.
Figure 2:
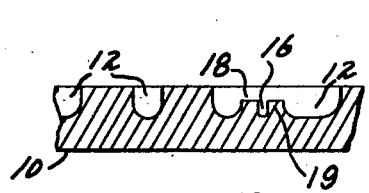
Fig. 2 is an enlarged section through a part of a die showing a modification.
Figure 3:
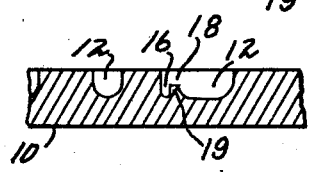
Fig. 3 is an enlarged section through a part of the die of Fig. 1.

Enough of the die to illustrate the invention is shown in Figs. 1, 2 and 3, wherein the character 10 indicates a part of a divided die or mold having depressions 12 in which the combs or toothed articles will be molded. A channel 14 provides a passage for the liquid plastic which is led around into a pair of small channels 16. The latter channels are provided with ports 18 leading into the interior lateral surfaces of the grooves which define the teeth.

The ports 18 may be double as in Fig. 2 to lead the molding material into adjacent teeth, or single as in Fig. 3 to lead the plastic into but one tooth.

Ports 18 are restricted as at 19 to define narrow areas in the layout described below for cutting off purposes.

As shown in Fig. 4, the combs 20 are formed as usual with outermost teeth 22 which are thicker than the inner teeth 24, as is the custom for articles of this type. The sprue 26, instead of being formed directly on the outside edge of the article, is led around as at 28 and in between an outer large tooth 22 and the next adjacent tooth 24. The die has the opening or port 18 from the plastic entrance-passage or gate into the inside or lateral surface of the tooth 22. This opening is restricted in area as described so that the sprue, when clipped or cut off, will leave as small a break or unfinished portion as possible. This portion is so small as to require no finishing, and is completely unnoticeable by the consumer, due to its hidden location at the inside surface of the tooth 22.

It will be seen that the run or sprue 26 is of relatively large diameter, so that the plastic material, which is apt to cool and harden along the surface of the die passage or gate, will nevertheless have a central passage therethru for flow of the hot plastic. This large run is continued right up to the space between tooth 22 and next adjacent tooth 24, and then is suddenly restricted at 30 to fit inbetween the teeth, thus making the breakage point extremely small. Even as small as the portion 30 is, the sprue is further restricted between the portion 30 and tooth 22, as at 32, to reduce the break to a minimum, but it has been found that this is a large enough opening for full flow of the plastic since the restriction 32 is very short in the direction of flow of the plastic. Also, the sprue is restricted, as at 33, so that it will not contact the free ends of the teeth.

Clearly, when the combs have cooled, the entire sprue can be cleanly clipped off at point 32, and the combs are ready for shipment without further processing, because of the novel location of the sprue with respect to the combs. That is, the break of the sprue from the comb is in substantially hidden position, and being cut off at 32, the resultant unpolished inner surface is negligible in extent and need not be finished.

At times it is found convenient to lead the plastic both into the tooth 22 and tooth 24, as shown in Fig. 6, but the result is substantially the same, except that the sprue must also be cut at point 34 as well as at 32.

Having thus described my invention and the advantages thereof, I do not wish to be limited to the details herein disclosed, otherwise than as set forth in the claims, but what I claim is:

1. In the method of manufacturing a plastic toothed article by injecting material into a die having teeth therein complementary to the teeth on the finished article, the step which comprises introducing the material into the mold at a point located between the adjacent surfaces of two teeth.

2. In the method of manufacturing a plastic toothed article by injecting material into a die having teeth therein complementary to the teeth on the finished article, the step which comprises introducing the material into the die at a point located on a side surface of a tooth facing a next adjacent tooth.

3. In the method of manufacturing a plastic toothed article by injecting material into a die having teeth therein complementary to the teeth on the finished article, the step which comprises introducing the material in to the die at points located on the facing side surfaces of two adjacent teeth.

4. In the method of manufacturing a plastic toothed article by injecting material into a die having teeth therein complementary to the teeth on the finished article, the step which comprises introducing the material into the die at an area located between the adjacent surfaces of two teeth, and limiting the section of the introduced material to less than the area of one of said surfaces.

5. In the method of manufacturing a plastic toothed article by injecting material into a die having teeth therein complementary to the teeth on the finished article, the step which comprises introducing the material into the die at a point located between the adjacent surfaces of two teeth, and forming a depression in the resultant sprue to indicate the point where the sprue is to be clipped.

6. The method of claim 1 wherein the material is introduced through one of said adjacent tooth surfaces.

7. The method of claim 1 wherein the material is introduced through both of said adjacent tooth surfaces.

8. In the method of manufacturing a plastic toothed article by injecting material into a die having teeth therein complementary to the teeth on the finished article, the step which comprises introducing the material into the mold at a point located between the adjacent surfaces of two teeth, said point lying in one of said surfaces.

9. In the method of manufacturing a plastic toothed article by injecting material into a die having teeth therein complementary to the teeth on the finished article, the step which comprises introducing the material into the mold at a point located between the adjacent surfaces of two teeth, said point including a portion of both of said surfaces.

EARL R. PERSON.